United States Patent

Raviv et al.

[15] 3,675,212

[45] July 4, 1972

[54] DATA COMPACTION USING VARIABLE-LENGTH CODING

[72] Inventors: Josef Raviv, Ossining; Michael A. Wesley, Somers, both of N.Y.

[73] Assignee: International Business Machines Corporation, Armonk, N.Y.

[22] Filed: Aug. 10, 1970

[21] Appl. No.: 62,306

[52] U.S. Cl. ....................340/172.5

[51] Int. Cl. ....................G06f 5/00, H03k 13/00

[58] Field of Search ....................340/172.5, 347 DD, 347 C

[56] References Cited

UNITED STATES PATENTS

| | | | |
|---|---|---|---|
| 3,448,436 | 6/1969 | Machol, Jr. | 340/172.5 |
| 3,317,898 | 5/1967 | Hellerman | 340/172.5 |
| 3,483,528 | 12/1969 | Koerner | 340/172.5 X |
| 3,533,085 | 10/1970 | Murphy | 340/172.5 |
| 3,461,432 | 8/1969 | Keiter et al. | 340/172.5 |
| 3,402,394 | 9/1968 | Koerner et al. | 340/172.5 |
| 3,465,303 | 9/1969 | Koerner | 340/172.5 |
| 3,509,328 | 4/1970 | Arnstein | 340/172.5 |

*Primary Examiner*—Harvey E. Springborn
*Attorney*—Hanifin and Jancin and C. P. Boberg

[57] ABSTRACT

A three-state associative memory is employed as an encoding-decoding instrumentality for making conversions between fixed-length codes and variable-length codes. During the encoding process, associations are performed upon fixed-length codes to find the corresponding variable-length codes. The shorter-length codes are assigned to the most frequently occurring words or bytes for achieving a minimum average code length. The available variable-length codes are stored in a field of the associative memory that has uniform word lengths. Memory cells which are not needed for storing bits of the variable-length codes are set to a "don't care" state. During each readout of a variable-length code, a corresponding "length" value is read out of the memory to indicate the number of valid bits that are to be read serially from the data register, excluding the "don't cares." During the decoding process, the bits of successive variable-length codes are fed serially to an argument register, and as each association is performed upon a variable-length code to find the corresponding fixed-length code, the "length" field indicates the number of bit positions by which the contents of the argument register are to be shifted for bringing the next variable-length code bit string into registry.

10 Claims, 6 Drawing Figures

INVENTORS
JOSEF RAVIV
MICHAEL A. WESLEY
BY Charles P. Boberg
ATTORNEY

ENCODE

DATA COMPACTION USING VARIABLE-LENGTH CODING

BACKGROUND OF THE INVENTION

Variable-length coding may be employed for data compaction purposes by assigning the shorter-length codes to the more frequently occurring words or bytes, thereby achieving an average code length which is less than that of the fixed-length code bit strings. The choice of variable-length codes to represent the various fixed-length codes is made in accordance with a statistical analysis of the particular data base which is being used. Assuming for example, that the data are to be processed in bytes, i.e., eight bits at a time, the byte configuration which occurs most frequently may be represented by only one bit in the variable-length coding scheme, the next most frequent combination by a pair of bits, and so forth. Preferably the variable-length codes are prefix-free, that is to say, none of these codes can form the beginning of a longer code bit string. The well-known Huffman codes, for example, meet this requirement. The construction of Huffman codes is described in an article by D. A. Huffman entitled "A Method for the Construction of Minimum-Redundancy Codes," in the Proceedings of the I.R.E., Vol. 50, September 1952, pages 1098–1101. Comparative examples of Huffman coding and other variable-length coding are shown in U.S. Pat. No. 3,016,527, issued to E. N. Gilbert et al. on Jan. 9, 1962.

Although variable-length coding is useful for economizing the facilities and time required for the transmission and storage of data that has been converted into such a code system, the data cannot be processed through a computer in this form and must be converted back to a fixed-length format for processing. The advantage of using variable-length coding to achieve data compaction therefore may be outweighed by the time lost in effecting code conversions by conventional methods. If the code conversion rate can be increased, however, it will greatly enhance the utility of variable-length coding and make its savings available to designers of data processing and data communication systems. There has been a great need for code conversion schemes that will make the use of variable-length coding more practical.

SUMMARY OF THE INVENTION

An important object of the invention is to effect conversions between fixed-length codes and variable-length codes in an economical and expeditious manner which will enhance the usefulness of variable-length coding for data compaction purposes.

In accordance with the present teachings, a three-state associative memory of novel design is employed for both encoding and decoding purposes. This memory includes a field for storing variable-length (VL) codes, a field for storing the corresponding fixed-length codes (often referred to as "identity" codes, or ID's) and a "length" field in which is stored a representation of the number of significant bits in each of the variable-length codes. Those memory cells in the variable-length code field which do not store significant code bits are set to a "don't care" state, in which they are effectively masked from interrogation during the association or search operations that are performed within this memory.

The inclusion of the aforesaid "length" field in the associative memory enables it to function optionally as a means for encoding a fixed-length parallel-bit input to a variable-length serial-bit output, or for decoding a variable-length serial-bit input to a fixed-length parallel-bit output. In the encoding mode, the value which is read from the "length" field denotes the number of valid bits that are to be read serially out of the data register after association has been performed, thereby limiting this readout to the desired variable-length code and excluding the "don't cares" stored in the remaining bit positions (if any) of the data register. In the decoding mode, the "length" value denotes the number of bit positions through which the contents of the argument register are to be shifted after association has been performed in order to bring the bits of the next succeeding variable-length code into proper registry for association.

DETAILED DESCRIPTION OF PREFERRED EMBODIMENT

Figure 1:
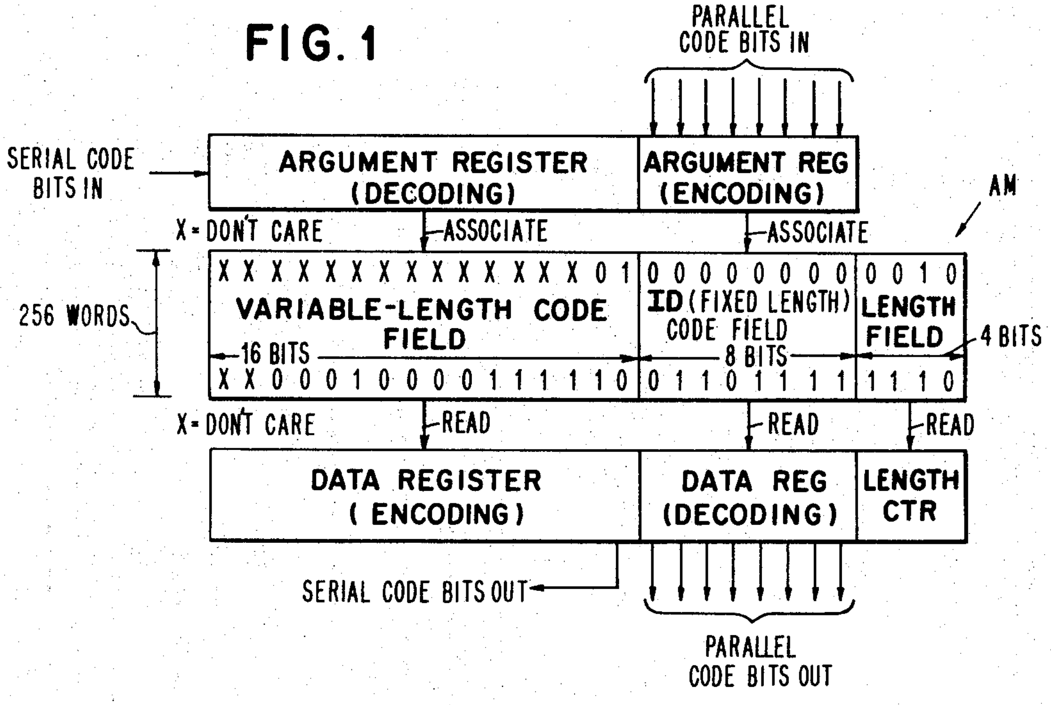
FIG. 1 is a general diagrammatic representation of an associative memory containing three-state memory cells and a length field for performing encoding and decoding operations in accordance with the invention.

FIGS. 1–5 show an embodiment of the invention in which the associative memory AM has one "word" or row of cells for each possible ID (fixed-length) code bit combination. Thus, assuming that the ID code length is eight bits, or one byte, there are 256 possible code bit combinations; hence 256 words of information are stored at the various addressable locations within the associative memory, as indicated in FIG. 1. The variable-length (VL) code field is made long enough to accommodate the VL code of greatest length, which is assumed to be 16 bits long in this particular example. This portion of the associative memory is loaded with variable-length codes which correspond respectively to the fixed-length (ID) codes stored at the same word addresses in the ID field of the memory. The VL codes are prefix-free, no one of these codes constituting the beginning of a longer code bit string.

The variable-length codes are positioned in right-justified fashion so that the significant bits of each code occupy the rightmost positions in the variable-length field. Those memory cells in this field which are not utilized for storing significant bits are set to their "don't care" state, as will be described in greater detail presently. The "don't care" state is represented by an X in FIG. 1. Thus, referring to the first row of cells in the variable-length field, there are two significant bits, "1" and "0," and 14 "don't cares" arranged in that order from right to left in this entry. The corresponding ID code in this particular example is assumed to be 00000000. (This relationship, of course, would not necessarily hold true for all data bases. As explained in the above-cited references on Huffman coding, the specific correlation between the fixed-length and variable-length codes depends upon the frequency with which each code occurs within the particular data base under consideration, the shortest variable-length codes being assigned to the most frequently occurring fixed-length codes.) The "length" field contains a four-bit entry 0010, which denotes that there are two significant bits in the corresponding variable-length code entry. Similarly, the final entry in this length field indicates that there are 14 significant bits in the final variable-length code entry. It is not necessary that the entries within a field of the associative memory be arranged in any given order relative to one another, so long as each entry is properly aligned with the corresponding entries in other fields.

Any suitable form of associative memory may be employed, provided it has three-state memory cells within its variable-length code storage section. For present purposes, it is satisfactory to employ an associative memory of the kind shown in U.S. Pat. No. 3,317,898 to H. Hellerman, dated May 2, 1967, modified as shown in FIG. 2 of the present drawings to provide a third or "don't care" state in those cells of the memory which require this property.

Figure 2:
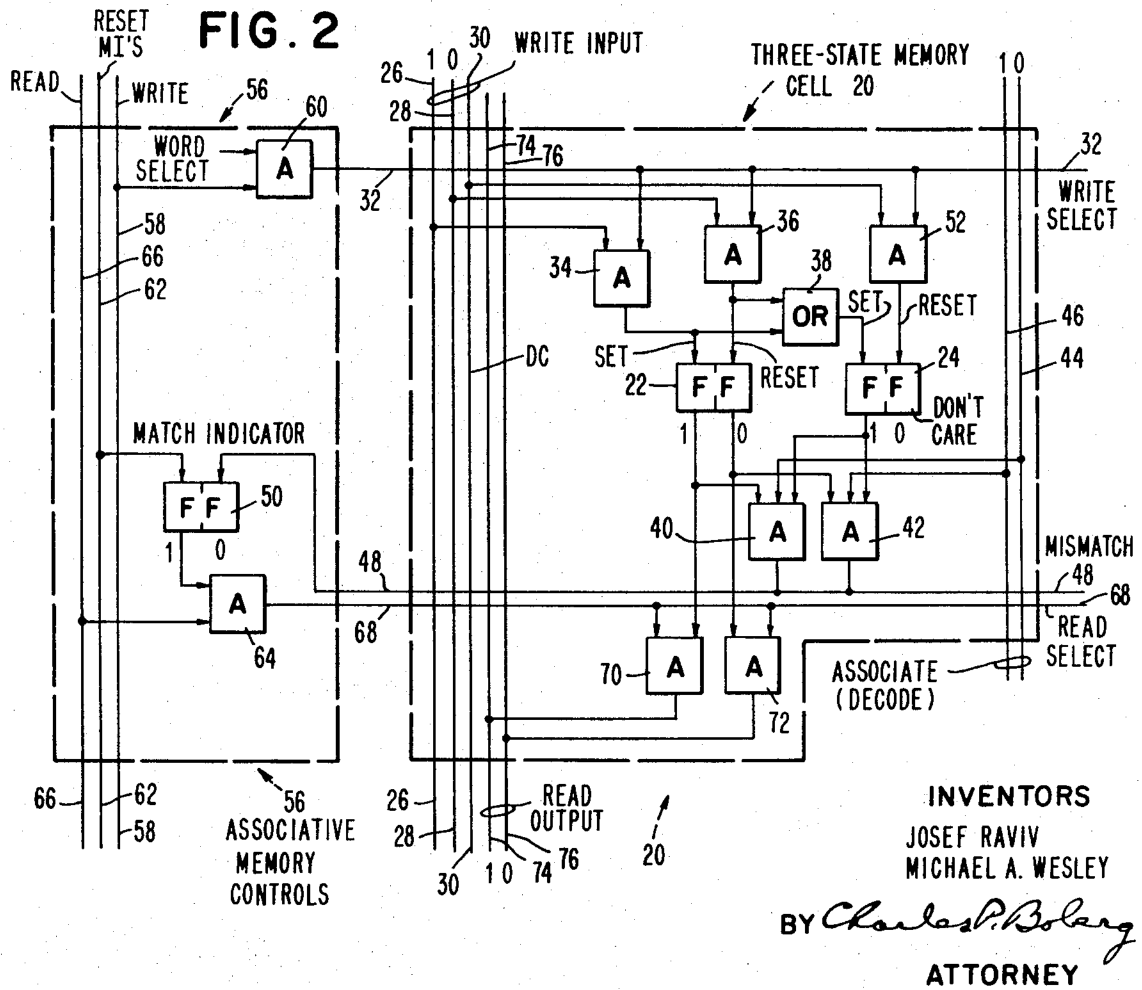
FIG. 2 is a schematic representation of some of the circuitry utilized in the associative memory of FIG. 1 and its related controls, showing the manner in which a three-state memory cell is employed therein.

Referring to FIG. 2, a typical three-state associative memory cell is represented within the dashed rectangle 20. This cell 20 includes flip-flop 22 for storing a binary 1 or binary 0. If the stored bit is significant, another flip-flop 24 is set to its "1" state, but if the stored bit is not significant (i.e., if the cell 20 is in its "don't care" state), the flip-flop 24 is reset to 0. The effect of this action will be explained presently.

The function of the "don't care" or third state will be described fully hereinafter in connection with the decoding operation of the illustrated apparatus. For the present, it is briefly explained that the "don't care" setting of a three-state associative memory cell masks this cell from interrogation so that it cannot generate a mismatch signal in response to any interrogating bit, whether the latter is a 1 or 0. The advantage of this "don't care" property is that it enables some of the cells in a given column to be masked without necessarily masking all of the other cells in that column. This is especially useful when decoding variable-length code words, as will become apparent in a subsequent part of the description dealing with the decoding operation.

To write information into the cell 20, one of three write input lines 26, 28 and 30 for this bit position will be energized in conjunction with the energization of a write select line 32 associated with the particular memory word in which the cell 20 is located. If lines 26 and 32 are simultaneously energized, for example, the coincidence of these signals at the AND gate 34 generates a signal for setting the flip-flop 22 to its "1" state. When lines 28 and 32 are coincidentally excited, a signal is passed by AND gate 36 for setting the flip-flop 22 to its "0" state. Each time a signal is passed through either gate 34 or gate 36 to the flip-flop 22, the same signal also passes through an OR gate 38 and is applied to flip-flop 24 for setting this flip-flop into its "1" state. The "1" output signals of flip-flops 22 and 24 are applied to a three-input AND gate 40. The "0" output from flip-flop 22 and the "1" output from flip-flop 24 are applied to a three-input AND gate 42. The third input to the AND gate 40 comes from a branch of the "0" associate line 44, while the third input to the AND gate 42 comes from a branch of the "1" associate line 46. The associate lines 44 and 46 are selectively pulsed according to whether a search is being made for a "1" or a "0" in the particular bit position under consideration.

The outputs, if any, of the two AND gates 40 and 42 are applied to a mismatch line 48, one such mismatch line being provided for each word of the associative memory. The mismatch line 48, when energized, resets the match indicator 50 for that word to its "0" state. A mismatch can occur if the cell 20 is storing a "0" when the "1" associate line 46 is pulsed, or if the cell 20 is storing "1" at the time when the "0" associate line 44 is pulsed, provided the cell 20 is not in its "don't care" state. The resulting coincidence of input signals at either the AND gate 40 or the AND gate 42 will place an output signal on the mismatch line 48.

To place the cell in the "don't care" state, the DC (don't care) write input line 30 is energized coincidentally with the energization of the write select line 32. This causes a signal to be passed by an AND gate 52 to reset the flip-flop 24 to its "0" state. With the flip-flop 24 in its "0" state, one of the inputs to each of the AND gates 40 and 42 is removed, thereby disabling both of these gates so that they cannot pass any signals to the mismatch line 48. Hence, when the cell 20 is in its "-don't care" state (with its flip-flop 24 set to "0"), the cell 20 always will act as though there has been a match, regardless of whether this cell has been interrogated on the "1" or "0" associate line 46 or 44, thereby effectively masking the cell 20 from interrogation.

The associative memory controls are fragmentarily represented to the extent necessary for present purposes within the dashed rectangle 56, FIG. 2. Further details of these controls are disclosed in the aforesaid Hellerman U.S. Pat. No. 3,317,898. When information is to be written into a selected word address of the associative memory, a write line 58 is energized to provide one input to each of a series of write select gates such as 60, of which there is one for each word. If a word select signal is applied to the other input of this gate, the corresponding write select line, such as 32, is energized to condition the memory cells of that word for receiving information from the write input lines such as 26, 28 and 30. When an "associate" or search operation is to be performed, the match indicators such as 50 for the various words are first reset to their "1" states by a pulse applied to a reset line 62. Then the various associate lines such as 44 and 46 are selectively pulsed for interrogating the related memory cells. If any one or more of the cells in a word generates a mismatch signal on the respective mismatch line such as 48, the match indicator such as 50 for that word is set to "0," thereby removing one input from the read select gate such as 64 for that word and preventing the respective word from being read out in response to the interrogation.

To read out the matching word, the read line 66 is energized. Assuming that the matching word is the one associated with the match indicator 50, FIG. 2, this indicator will receive no mismatch signal and consequently will remain in the "1" state to which it initially was set, and the AND gate 64 therefore will be conditioned to pass the read signal from line 66 to the read select line 68. The signal on line 68 conditions a pair of AND gates such as 70 and 72 for reading the data out of each memory cell such as 20 in the selected memory word. Depending upon the state of the storage flip-flop 22, a signal is passed through one or the other of the AND gates 70 and 72 to the "1" or "0" read output line 74 or 76.

If the cell 20 is in a "don't care" state (flip-flop 24 set to 0), this setting will have no effect upon the readout of the data stored in flip-flop 22. The 1 or 0 value which happens to be stored in flip-flop 22 at that time is read out regardless of whether or not the cell 20 is in its "don't care" state. Other arranGements (to be described hereinafter) are made for disregarding those bits which are read out of the cells that are in their "don't care" state. The "don't care" setting merely disables the mismatch gates 40 and 42 of the cell. It does not affect the readout gates 70 and 72 of that cell.

Figure 3A:
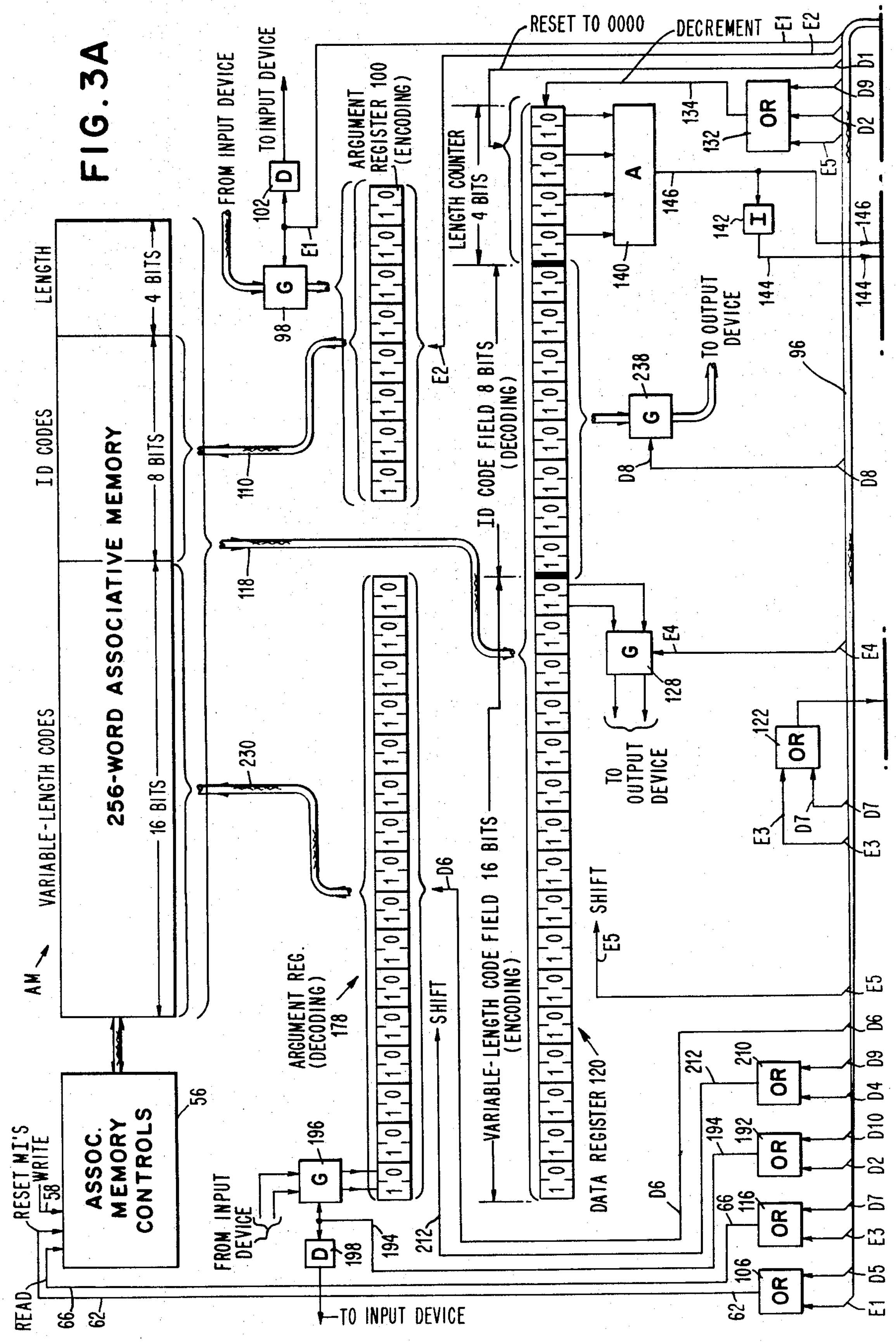
FIGS. 3A and 3B, when assembled, constitute a more detailed circuit diagram of an associative memory and its related controls for carrying out the invention in accordance with the scheme shown generally in FIG. 1.
Figure 4:
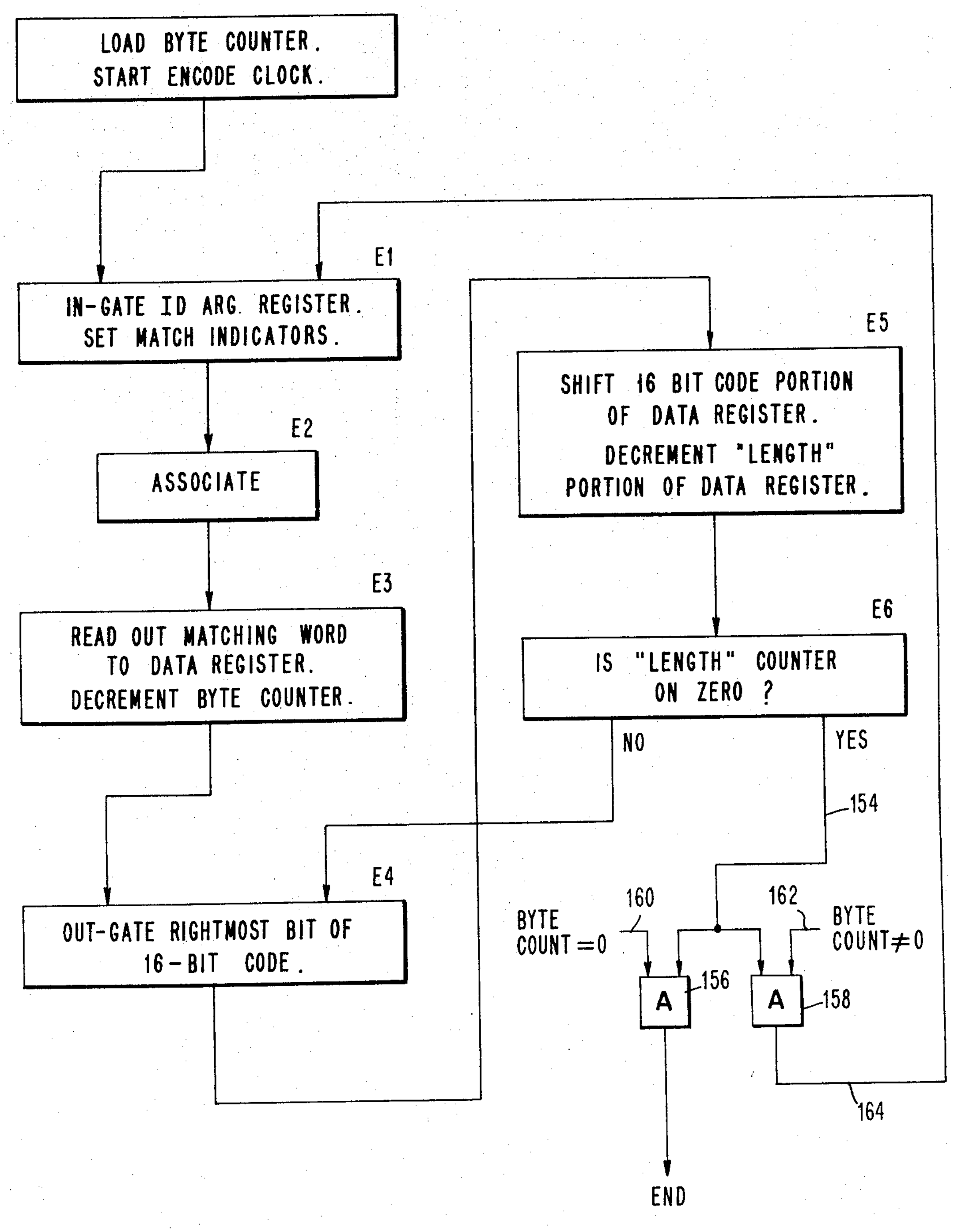
FIG. 4 is a flowchart depicting the operation of the apparatus shown in FIGS. 3A and 3B while it is in its encoding mode.
Figure 5:
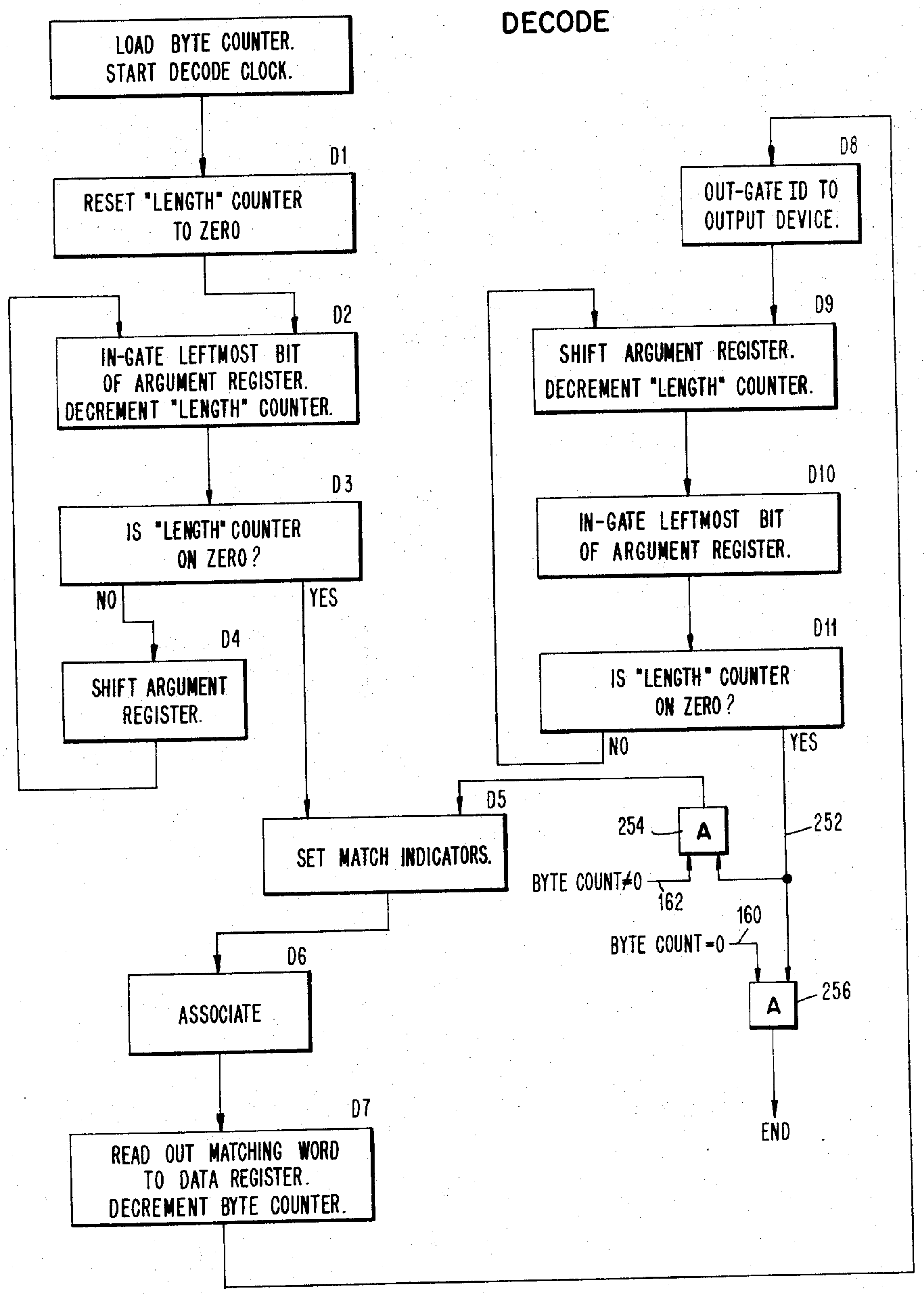
FIG. 5 is a flowchart depicting the operation of the apparatus shown in FIGS. 3A and 3B while it is in its decoding mode.

The operation of the apparatus shown in FIGS. 3A and 3B will be described with reference to the flowcharts shown in FIGS. 4 and 5. Consideration first will be given to the encoding operation, in which a fixed-length ID code is converted to a corresponding variable-length code. It is assumed that the associative memory AM, FIG. 3A, previously has been loaded with the necessary ID and variable-length code entries, together with their related "length" entries for denoting the number of significant bits in each variable-length code bit string.

As mentioned hereinabove, it is assumed by way of example that the ID codes have a length of eight bits, i.e., one byte, and that the variable-length codes may have any length from one to sixteen bits. To represent a length count of up to 16 bits, with 0000 representing "16", a four-bit length representation will suffice. Accordingly, the associate memory AM, FIG. 3A, has a 16-bit field for storing variable-length codes, an eight-bit field for storing the ID codes, each of which is one byte in length, and a four-bit length field, each entry in which measures the number of significant bits in the corresponding variable-length code. In the embodiment of FIGS. 3A and 3B, it is further assumed that all possible ID byte configurations (256 in all) will be accommodated by the associative memory AM.

Figure 3B:
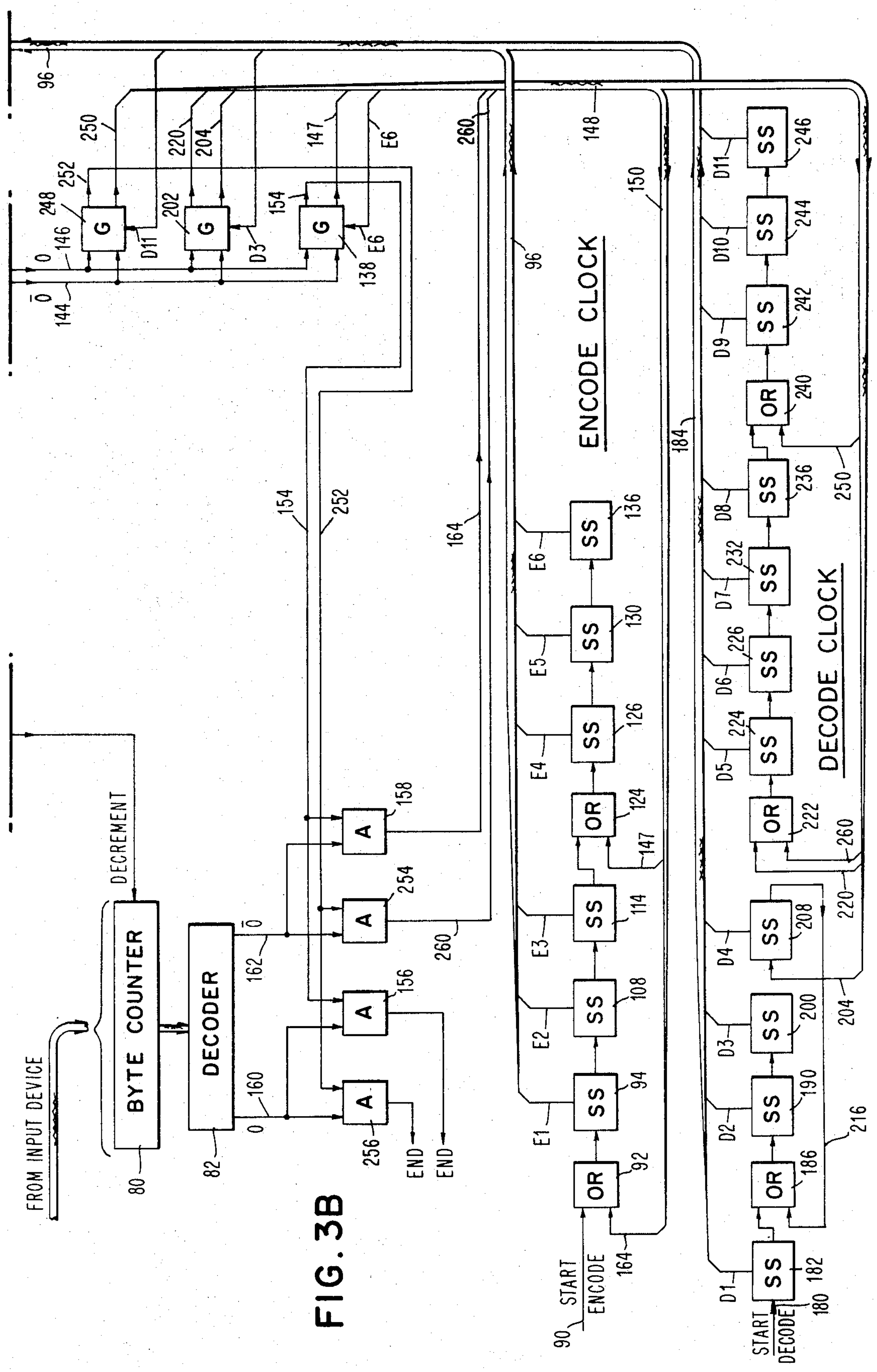

Before the encoding operation commences, the number of ID bytes to be encoded is entered into the byte counter 80, FIG. 3B. A data source or input device which will supply this number of bytes is assumed. If the input device operates at a different speed than the associative memory, appropriate buffering may be employed. The setting of the byte counter 80 is progressively decremented as the ID bytes are encoded, and the current setting is decoded to a "zero" or "not zero" output by a decoder 82. A zero output from decoder 82 terminates the encoding operation. This will be explained in greater detail hereinafter.

In describing the encoding operation, reference will be made to FIG. 4, in conjunction with FIGS. 3A and 3B. It should be understood that the apparatus schematically shown in FIGS. 3A and 3B is merely an illustrative embodiment and is not necessarily the form in which the invention would be fabricated for commercial use. The encoding operation is initiated by applying a "start" pulse on a wire 90 which leads to an "encode" clock circuit. The start pulse passes through an OR circuit 92 to a single-shot 94, causing it to be turned on for generating a pulse on wire E1 which passes through a cable 96, FIGS. 3B and 3A. The pulse on wire E1 is applied to a gate 98, FIG. 3A, enabling it to pass a byte from the input device (not shown) to the ID argument register 100. The argument register 100 now holds the byte that currently is to be encoded. The same pulse also is extended from wire E1 through a delay circuit 102 to the input device for causing it to place the next ID code byte on the input lines leading to the gate 98. The E1 pulse also extends through an OR circuit 106, FIG. 3A to the wire 62 (also shown in FIG. 2), energization of which resets the match indicators in the associative memory controls 56 to their "1" state. The apparatus is now in condition to perform the encoding function.

When single-shot 94, FIG. 3B goes off, it turns the single-shot 108 on. This produces a pulse on a wire E2 that extends through cable 96 to the argument register 100 for placing a pattern of 1's and 0's on the associate lines 110 according to the setting of the ID argument register 100. These associative lines 110 perform a function similar to that of the associate lines 44 and 46 described hereinabove with reference to FIG. 2, except that they are in this instance applied to memory cells in the ID code section of the associative memory AM. This causes the various ID codes to be searched in order to find the word containing the variable-length code which corresponds to the ID code in the argument register 100.

When the single-shot 108, FIG. 3B turns off, it turns on the next single-shot 114, which generates a pulse on wire E3 in cable 96. The pulse on wire E3 is extended through an OR circuit 116, FIG. 3A to the read line 66 of the associative memory controls 56, FIGS. 3A and 2. Pulsing of the line 62 effects a readout of the matching word in the associative memory through cable 118, FIG. 3A, to the data register 120, thereby causing the information stored in the various fields of this matching word to be entered into the data register 120. This information includes the 16 bits in the variable-length code section of the matching word plus the eight bits in the fixed-length ID section of the word and the four bits in the length field of this word. At the same time that this action occurs, the pulse on wire E3 also is applied through an OR circuit 122 to decrement the byte counter 80.

The data register 120 is shown in FIG. 3A as a composite three-part register which behaves as a single register for the purpose of receiving parallel entries through a common input cable 118, but thereafter it functions as three independent registers pending the next succeeding entry of data therein. The lack of interdependence among the three register parts is indicated in FIG. 3A by the extra heavy dividing lines shown at the two ends of the "ID CODE FIELD" in register 120. The use of a composite register which receives parallel entries but processes the entered items separately is well known, as shown, for example, in the IBM Customer Engineering Manual of Instruction for the 7100 Central Processing Unit (Type 7090 Data Processing System), Form 223–6860, FIG. 1.2–1, page B10, paragraphs 3.1.06 and 3.1.07. For present purposes, however, it would be equally feasible to utilize three separate registers for handling the VL, ID and length sections of the data word, respectively, with separate input cables being provided to these three registers. When the single-shot 114 goes off, it sends a pulse through the OR circuit 124 to turn on the single-shot 126. This puts a pulse on line E4 which extends to gate 128, FIG. 3A, thereby conditioning gate 128 to pass the rightmost bit from the variable-length field of data register 120 to the output device.

When the rightmost bit of the variable-length code has been outgated in this fashion, it is necessary to shift the contents of the variable-length field in data register 120 to the right by one bit-storing position. This is accomplished when single-shot 126 goes off, causing single-shot 130 to be turned on for generating a pulse on wire E5. This pulse on wire E5 is applied to an appropriate shifting means (not shown) to effect a one-bit rightward shift of the variable-length code bits stored in the data register 120, as indicated by the arrow on line E5 in FIG. 3A.

The portion of the data register 120 which stores the four-bit length code is utilized as a length counter. For each rightward shift of the variable-length code digits stored in register 120, this length count is reduced by 1. Such decrementing of the length counter is accomplished in the present instance by the E5 pulse passing through an OR circuit 132 to a line 134, which leads to the means (not shown) for decrementing the value stored in the length counter (last 4 bits of data register 120).

A test now is made to determine whether the length count has been reduced to 0, that is to say, whether all of the significant bits of the current variable-length code have been shifted out of the data register 120. When single-shot 130 goes off, FIG. 3B, single-shot 136 goes on, placing a pulse on wire E6 which leads to gate 138, FIG. 3B. Zero (0) and not-zero ($\bar{0}$) input lines are extended to gate 138 from AND circuit 140, to which the 0 outputs in any of the four orders of the length counter are applied. If the AND circuit 140 has no output, meaning that at least one of the bits in the length counter is a 1, an inverter 142 applies a voltage on the not-zero input line 144 to gate 138. For an all-zero setting of the length counter, the zero input line 146 to gate 138 is energized. Assuming in the present instance that more than one code bit is to be shifted out of the data register 120, the gate 138 receives a not-zero input, thereby causing an output wire 147 leading from gate 138 to be energized. Wire 147 passes through cables 148 and 150 to the OR circuit 124, whereby the not-zero length count pulse is applied to single-shot 126. This initiates a new cycle of operations involving the successive energization of single-shots 126, 130 and 136. During this action, there will occur the readout of another bit from the rightmost position in the variable-length code field of data register 120, a resulting one-bit rightward shift of the regaining bits in this field and a testing of the length-counter setting to see whether it has been reduced to all zeros.

The steps of the operation which involve the energization of single-shots 126, 130 and 136 and the resultant pulsing of wires E4, E5 and E6 is repeated as often as necessary (FIG. 4) until the length count reduces to 0. At this point, the last significant bit has been read out of the variable-length code field of data register 120, and the remaining bits in this field are of no interest, having come from memory cells which were in their "don't care" state or else having been introduced into the register during the shifting process. The operation now exits from the right shift subroutine. When gate 138, FIG. 3B, is activated by the pulse on wire E6, the 0 input line 146 will have been energized in response to an all-zero setting of the length counter, and the output line 154 from gate 138 accordingly is energized to apply an input to each of the AND circuits 156 and 158, FIG. 3B. A second input to AND circuit 156 is supplied by a 0 output line 160 from decoder 82 only if the setting of the byte counter 80 has been reduced to 0. If the setting of the byte counter 80 is not 0, the decoder supplies an output on line 162 to the AND circuit 158. Assuming in this instance that the byte counter setting is not zero, meaning that there are additional ID bytes to be decoded, the coincidence of inputs at the AND circuit 158 places a pulse on wire 164 which passes through cables 148 and 150 to the OR circuit 92, thereby extending a pulse through this OR circuit to single-shot 94. This commences a new encoding cycle as indicated by the steps E1 to E6 in FIG. 4.

The above described encoding cycle is repeated as often as necessary to bring the byte counter setting down to zero. When the last ID byte has been encoded, and the setting of byte counter 80 becomes zero, the decoder 82 furnishes a zero output to the AND gate 156. Then, when the length-counter setting becomes zero, indicating that the last of the encoded digits has been read out of the data register 120, the coincidence of excitations on the AND gate 156 generates a pulse for ending the operation of the system.

When the apparatus is operated in its "decode" mode, the bits of the variable-length code which are to be decoded are fed serially into an argument register 178, FIG. 3A, which has 16 bit storage positions. The number of variable-length codes which will be stored in this register 178 at any one time is indeterminate. Thus, for example, if the coding, scheme is such that the variable-length codes may have lengths varying from one bit to 16 bits, then the 16-bit argument register may (at least in theory) contain 16 one-bit codes, or one 16-bit code, or any number of codes in between, depending upon the random distribution of codes having various lengths throughout the incoming data stream. At the start of each decoding operation, however, it is necessary that the first bit in the first variable-length code that awaits decoding. be located in the rightmost position of argument register 178. This is accomplished through means which will be described hereinafter.

The decoding operation of the system will be described with reference to FIGS. 3A, 3B and 5. In the flowchart FIG. 5, the various steps D1, D2, etc., correspond to actions produced by pulses on various wires D1, D2, etc., as described hereinafter. The decoding operation is started by applying a pulse on the "-start" wire 180 to activate the single-shot 182 in the decode clock. As single-shot 182 is turned on, it extends a pulse through wire D1 and cables 184 and 96, FIGS. 3B and 3A, to the resetting means for the length counter comprising the right-most four bit storing positions in the data register 120. The effect of the pulse on wire D1 is to reset the length counter to its all-zeros state, and thereby condition the length counter for counting the first 16 bits of information which will be fed serially into the argument register 178. It is necessary to insure that 16 bits of new information have been entered into the argument register 178 before decoding operations can commence, and the length counter is instrumental in making this determination.

When single-shot 182 goes off, it sends a pulse through the OR circuit 186 to single-shot 190, which generates a pulse on wire D2. The pulse on wire D2 passes through an OR circuit 192, FIG. 3A, and a wire 194 to a gate 196, thereby enabling gate 196 to pass the first bit from the input device into the leftmost bit storing position of argument register 178. The pulse on wire 194 also extends through a delay device 198 to the input device for causing the next bit to become available for transfer. The bit which just was entered into the argument register 178 eventually must be shifted to the right until it occupies the rightmost bit storing position in that register. The D2 pulse also extends through OR circuit 132, FIG. 3A to the length counter decrementing line 134, causing the length count to be decremented by 1. If the length counter initially stood at 0000, the first decrementing action will change this setting to 1111.

When single-shot 190 goes off, FIG. 3B, single-shot 200 is turned on, generating a pulse on wire D3. This D3 pulse is applied to a gate 202 which receives its input from the not-zero wire 144 or the 0 wire 146 associated with the length counter. If the length count does not stand at 0, as is true in the present instance, a signal passes from the wire 144 through gate 202 to wire 204, which leads to a single-shot 208, FIG. 3B.

When single-shot 208 turns on, it puts a pulse on the wire D4, which pulse then passes through an OR circuit 210, FIG. 3A, to a wire 212 which leads to the shifting means (not shown) of the argument register 178. Such action causes the contents of the argument register 178 to be shifted right by one bit storing position, so that the leftmost bit storing position of this register will be ready to receive a new bit entry.

When single-shot 208 goes off, it sends a pulse through wire 216 and OR circuit 186 to single-shot 190, turning the latter on. The sequence of steps D2 and D3, FIG. 5, now is repeated as the single-shots 190 and 200 and are successively energized. At step D3, the setting of the length counter again is tested, and if this setting still is not 0000, single-shot 208 is turned on for executing step D4, whereby the contents of the argument register 178 are shifted right.

This sequence of entering a bit of information into the argument register 178, decrementing the length counter, testing the length counter setting and right-shifting the contents of the argument register 178 is repeated until the test at step D3 finally shows that the length counter setting is 0000. This indicates that the first 16 bits of information have been fed into the argument register 178 and that the first bit of the first variable-length code is now in the extreme right-hand position of this register. At this point, the D3 pulse is applied to the gate 202, FIG. 3B, energization is extended from the 0 output line 146 of the length counter through gate 202 to a wire 220 which leads to the OR circuit 222, FIG. 3B, through which the energization is further extended to single-shot 224. As the single-shot 224 is turned on, it pulses a wire D5 which extends through cables 184 and 96 and OR circuit 106, FIG. 3A to the match indicator reset line 62, thereby resetting the match indicators of the associative memory controls 56, FIGS. 3A and 2, to their 1 states. When single-shot 224 goes off, it causes single-shot 226 to be turned on for pulsing the wire D6. This applies a pulse to argument register 178, FIG. 3A for initiating an "associate" operation wherein the contents of the argument register 178 are transmitted through the associate lines 230 to the variable length code field of the associative memory AM. The associate lines 230 include lines such as 44 and 46 shown in FIG. 2 for interrogating the various three-state memory cells which store the variable-length codes in the associative memory. Those memory cells which are in their "don't care" states are incapable of generating any mismatch signals. Those memory cells which are not in their "don'5 care" states and which do not store bits that match the signals on the interrogation lines 230, FIG. 3A, will generate mismatch signals for setting their respective match indicators to 0.

It has been explained above that the variable length codes are prefix-free. Hence, the code bits in the argument register 178 will match only one code word in the associative memory AM, and this will be the code word whose significant bits exactly match the bits of the variable-length code string positioned at the right end of the argument register 178. This is true regardless of how many other variable length codes are stored in other positions of the argument register 178.

As a specific example, assume that at the beginning of a decoding operation the argument register 178 is storing the following sequence of bits:

1 0 0 1 1 0 1 0 0 0 1 1 1 1 0 1

A certain number of these bits, counting from the right end of the sequence, will constitute the first VL code that is to be decoded. At this time, however, the apparatus has not yet determined how many of these bits are in the first VL code. A human observer who happened to know the patterns of bits stored in the respective rows of the VL code section of the associative memory AM would be able to tell that the bit sequence in the above argument matches the bit pattern in the top row of the VL section, assuming that it is as represented in FIG. 1. Because of the "prefix-free" property of the VL codes, this top code is the only one of the VL codes stored in memory AM whose right-end portion matches a corresponding right-end portion of the bit sequence currently stored in the argument register. In this instance, the pair of bits "01" at the right end of the top word in the VL section of memory AM, FIG. 1, matches the bit pair "01" at the right end of the argument. Whether or not the remaining bits of this word are identical with the remaining bits of the argument is immaterial in this case, because all of the other cells in this top row of the VL memory section are in their "don't care" (X) state, as shown in FIG. 1. The fact that only the first two bits of the stored word are significant in this instance is indicated by the binary number "0010" (decimal 2) stored in the corresponding row of the length field, FIG. 1. However, it is not until this length indicator is actually read from the length field (in the manner subsequently explained) that the apparatus knows the length of the first VL code that currently awaits decoding in the argument register. This is necessarily so because the illustrated apparatus is intended to operate under conditions where it is not possible to know in advance the length of each variable-length code that is presented for decoding.

When single-shot 226 goes off, single shot 226 is turned on to generate a pulse on wire D7, which extends through cables 184 and 96 to OR circuit 116, FIG. 3A. This pulse is then applied through OR circuit 116 to the read line 66 of the associative memory controls 56. The match indicator which is then in its 1 state will indicate the address of the matching word in the associative memory, and this matching word is read out of the associative memory through the output lines 118 to the data register 120. This matching word contains the fixed-length ID code which is sought, and it also contains a length count. These items of information are stored in the appropriate portions of the data register 120. The D7 pulse also is passed through the OR circuit 122, FIG. 3A to decrement the byte counter 80, FIG. 3B.

When the single-shot 232 goes off, it turns on a single-shot 236. This produces a pulse on wire D8, which pulse is applied to a gate 238, FIG. 3A, enabling it to out-gate the eight-bit identity code portion of the information stored in the data register 120 to the output device.

At this time, the four-bit length counter (right-hand four positions of data register 120, FIG. 3A) registers the number of significant bits contained in the variable length code that was just decoded. The contents of the argument register must now be right-shifted by this amount in order to bring the first bit of the next succeeding variable-length code into the rightmost position of this argument register. This is done in the following manner:

When single-shot 236 goes off, it transmits a pulse through the OR circuit 240 for turning single-shot 242 on. This produces a pulse on wire D9, FIGS. 3B and 3A, which passes through the OR circuit 210 to the right shift line 212. As a result of this action, the contents of the argument register 178 are shifted one bit to the right. At the same time, the pulse on wire D9 extends through the OR circuit 132, FIG. 3A to the length-counter decrementing wire 134, thereby causing the length count to be decremented by 1.

When single-shot 242 goes off, it causes single-shot 244 to be turned on, thereby producing a pulse on wire D10. This pulse passes through OR circuit 192 and wire 194 to the gate 196, FIG. 3A for in-gating the next bit into the leftmost position of the argument register 178. At the same time, a pulse extends through the delay unit 198 to the input device so that it can make a new bit available on the input side of the gate 196.

When single-shot 244 goes off, it turns on the single-shot 246. This places a pulse on line D11 which extends to gate 248, FIG. 3B, causing the condition of the length counter to be tested. If the length count has not yet been reduced to 0, the gate 248 passes a pulse from the not-zero line 144 to a wire 250 leading to the OR circuit 240, FIG. 3B. As a result of this, the single-shot 242 again is turned on to re-initiate the sequence of steps D9, D10 and D11, FIG. 5. Thus, the contents of the argument register 178 are progressively shifted to the right until the current length count is reduced to 0. When this condition is attained, the bit in the lowermost order in the next succeeding variable-length code will have been positioned at the right end of the argument register 178, and the apparatus then is ready to perform a new association on this variable-length code.

Referring again to FIG. 3B, when the length count reduces to 0 and single-shot 246 is turned on, energization is extended from the 0 line 146 through gate 248 to a line 252 which supplies an input to each of the AND circuits 254 and 256. If the byte counter 80 is still in a non-zero setting at this time, the decoder 82 furnishes a signal on line 162 which passes through the AND circuit 254 to a wire 260 and thence through the OR circuit 222, FIG. 3B to the single-shot 224, turning this single shot on. As a result of this action, the steps designated D5 through D11 in the flow chart, FIG. 5, are repeated. Such action recurs until the byte counter setting stands at 0. Then, when single-shot 246, FIG. 3B goes on, the gate 256 becomes active to generate a signal for ending the decode operation.

While the invention has been particularly shown and described with reference to a preferred embodiment thereof, it will be understood by those skilled in the art that changes in form and details may be made therein without departing from the spirit and scope of the invention.

What is claimed is:

1. In a process for effecting conversions between variable-length and fixed-length codes by the use of a computer having a memory and a shift register, the steps of:

a. storing in a first portion of said memory a plurality of variable-length codes which are prefix-free, said variable-length codes being arranged respectively in rows of memory cells wherein the cells that do not store significant code bits are individually masked from interrogation;

b. storing in a second portion of said memory a plurality of fixed-length codes respectively corresponding to but being differently coded than said plurality of variable-length codes;

c. storing in a third portion of said memory a plurality of length indicators corresponding respectively to said plurality of variable-length codes for denoting the respective numbers of significant bits contained in said variable-length codes;

d. storing a selected variable-length code in said shift register in a position for being decoded, with an end bit of such code being initially located in an end position of said register, said selected variable-length code having a unique matching relationship with not more than one of the variable-length codes stored in said first memory portion, e. associatively identifying the selected variable-length code in said shift register with a matching variable-length code stored in said first memory portion and with the corresponding fixed-length code and length indicator respectively stored in said second and third memory portions;

f. reading out the associated fixed-length code thus identified as a decoded output of said process; and g. shifting the contents of said register through the number of bit-storing positions designated by the associated length indicator for enabling said register to store a succeeding variable-length code in position for decoding.

2. In a process for effecting conversions between fixed-length and variable-length codes by the use of a computer having a memory and a shift register, the steps of:

a. storing in a first portion of said memory a plurality of variable-length codes which are prefix-free;

b. storing in a second portion of said memory a plurality of fixed-length codes respectively corresponding to but being differently coded than said plurality of variable-length codes;

c. storing in a third portion of said memory a plurality of length indicators corresponding respectively to said plurality of variable-length codes for denoting the respective numbers of significant bits contained in said variable-length codes;

d. selecting one of the fixed-length codes stored in said second memory portion and associatively identifying such selected code with the corresponding variable-length code and length indicator respectively stored in said first and third memory portions;

e. entering into said shift register a variable-length code identical with said corresponding variable-length code, with an end bit of the code thus entered being initially located in an end position of said register; and f. shifting the contents of said register through the number of bit-storing positions designated by the associated length indicator, thereby to read out the variable-length code stored in said register as an encoded output of said process.

3. In a method of decoding variable-length prefix-free codes into corresponding fixed-length codes by the use of an associative memory having an argument register through which code bits can be serially fed and having rows of memory cells respectively storing a plurality of words each containing a variable-length code field and a fixed-length code field, at least some of the memory cells in each of said rows being three-state cells each capable of assuming a significant binary 1 or 0 state or a "don't care" state wherein the bit which it stores is not significant, the steps of:

a. storing within selected ones of the three-state memory cells in respective rows of a first field of said memory the significant bits of the variable-length codes which can be decoded by said memory, with an end bit of each such code being positioned nearest a given end of said first field;

b. storing "don't care" representations within those memory cells in said first field which are not utilized for storing the significant bits of the variable-length codes stored in said first field;

c. storing in corresponding rows of the memory cells in a second field of said memory the bits of the fixed-length codes which respectively correspond to but are differently coded than the variable-length codes stored in said first field;

d. storing in corresponding rows of the memory cells within a third field of said memory predetermined length indicators representing the respective numbers of significant bits contained within the variable-length codes stored in said first field; each such length indicator along with its corresponding variable-length code and the corresponding fixed-length code stored in said memory being included within the respective one of said stored words;

e. entering into said argument register, to the capacity of said register, the bits of successive ones in a given series of variable-length codes which are to be decoded, with the end bit of the first such code in the series occupying an end position in said argument register corresponding to said given end of said first field, each code in said series having a unique matching relationship with not more than one of the variable-length codes stored in said first memory field;

f. associatively identifying the current contents of said argument register with the contents of a stored word in said memory whose first field contains a variable-length code matching the variable-length code that has a bit in said end position of said argument register;

g. retrieving from the second field of the matching word thus identified the fixed-length code which corresponds to said first variable-length code in the argument register;

h. shifting the contents of said argument register through the number of bit positions represented by the length indicator stored in the third field of said matching word and concurrently entering into said register as many succeeding new bits of said series as are then available, up to the number of bits shifted out of said register; and i. repeating steps *f* through *h* as many times as needed to decode all of the variable-length codes in said given series.

4. In a method of encoding fixed-length codes into corresponding variable-length codes by the use of an associative memory having a data register out of which code bits can be serially fed and having rows of memory cells respectively storing a plurality of words each containing a variable-length code field and a fixed-length code field, at least some of the memory cells in each of said rows being three-state cells each capable of assuming a significant binary 1 or 0 state or a "-don't care" state wherein the bit which it stores is not significant, the steps of:

a. storing within selected ones of the three-state memory cells in selected rows of a first field of said memory the significant bits of the available variable-length codes, with the bit in a given end position of each such code being positioned nearest a given end of said first field;

b. storing "don't care" representations within those memory cells in said first field which are not utilized for storing the significant bits of the variable-length codes stored in said first field;

c. storing in corresponding rows of the memory cells in a second field of said memory the bits of fixed-length codes which respectively correspond to but are differently coded than the variable-length codes stored in said first field;

d. storing in corresponding rows of the memory cells within a third field of said memory predetermined length indicators representing the respective numbers of significant bits contained within the variable-length codes stored in said first field; each such length indicator along with its corresponding variable-length code and the corresponding fixed-length code stored in said memory being included within the respective one of said stored words;

e. selecting a fixed-length code and associatively identifying it with the stored word containing a matching fixed-length code;

f. entering into said data register the information contained in the first field of said identified work, with the variable-length code in such entry being positioned so that its given end bit is at a corresponding end position of said register; and g. reading serially out of said register, starting with said end bit, the number of bits designated by the length indicator in the third field of said identified word, thereby retrieving the bits of the variable-length code corresponding to the selected fixed-length code without thereby reading out any of the bits stored in those memory cells of the identified word that are in their "don't care" state.

5. An associative memory apparatus for use as an encoder-decoder to effect conversions between codes having bit strings of fixed length and corresponding but differently coded prefix-free codes having bit strings of variable length, said apparatus comprising:

a. rows of memory cells respectively storing a plurality of words, each word containing a variable-length code, a corres-ponding fixed-length code, and a length indicator which denotes the number of significant bits in the corresponding variable-length code, the cells for storing the variable-length codes being three-state cells arranged in a code field which contains a uniform number of cells for each row, each three-state cell being capable of assuming a significant binary 1 or 0 state or a "don't care" state wherein the bit which it stores is not significant;

b. argument storing means having a portion effective when said apparatus is functioning as a decoder to store strings of bits contained in a series of variable-length codes which are to be decoded, each such variable-length code having a unique matching relationship with not more than one of the variable-length codes stored in said memory cells, and also having a portion effective when said apparatus is functioning as an encoder to store the bits of a fixed-length code which is to be encoded, the portion of said argument storing means which stores variable-length codes during decoding operations being selectively operable to shift the bits stored therein progressively through successive orders;

c. data storing means having a portion effective when said apparatus is functioning as an encoder to store bits which are read from memory cells in the field storing the variable-length codes and having a portion effective when said apparatus is functioning as a decoder to store bits read from cells storing the fixed-length codes, and also having a length counter for storing length indicators read from the related memory cells during both encoding and decoding operations, the portion of said data storing means which stores variable-length codes during encoding operations being selectively operable to shift the bits stored therein progressively through successive orders;

d. decoding control means having a portion effective during decoding operations for causing variable-length code bits to be shifted serially into, out of and through said argument storing means as determined by the data stored in said length counter and having another portion for causing fixed-length codes to be read from said data storing means in response to the presence of variable-length codes in said argument storing means; and e. encoding control means having a portion effective during encoding operations for causing code bits to be read from said variable-length code storing field and entered into said data storing means in response to the presence of fixed-length codes in said argument storing means and having another portion for causing selected numbers of these variable-length code bits to be serially shifted through and read out of said data storing means as determined by the data stored in said length counter, thereby excluding insignificant bits from the codes thus read out.

6. An associative memory apparatus for use as a decoder to convert prefix-free codes having bit strings of variable length into corresponding codes of different form having bit strings of fixed length, said apparatus comprising:

a. rows of memory cells respectively storing a plurality of words, each word containing a variable-length code, a corresponding fixed-length code, and a length indicator which denotes the number of significant bits in the corresponding variable-length code, the cells for storing the variable-length codes being three-state cells arranged in a code field which contains a uniform number of cells for each row, each three-state cell being capable of assuming a significant binary 1 or 0 state or a "don't care" state wherein the bit which it stores is not significant;

b. an argument register for storing strings of bits contained in a series of variable-length codes which are to be decoded, each such variable-length code having a unique matching relationship with not more than one of the variable length codes stored in said memory cells, said argument register being selectively operable to shift the bits stored therein progressively through successive orders;

c. a data register for storing bits read from memory cells storing the fixed-length codes;

d. a length counter for storing length indicators read from the related memory cells; and e. decoding control means having a portion for causing variable-length code bits to be shifted serially into, out of and through said argument register as determined by the data stored in said length counter and having another portion for causing fixed-length codes to be read from said data register in response to the presence of variable-length codes in said argument register.

7. An associative memory apparatus for use as an encoder to convert codes having bit strings of fixed length into corresponding codes of different form having bit strings of variable length, said apparatus comprising:

a. rows of memory cells respectively storing a plurality of words, each word containing a variable-length code, a corresponding fixed-length code, and a length indicator which denotes the number of significant bits in the corresponding variable-length code, the cells for storing the variable-length codes being three-state cells arranged in a code field which contains a uniform number of cells for each row, each three-state cell being capable of assuming a significant binary 1 or 0 state or a "don't care" state wherein the bit which it stores is not significant;

b. an argument register for storing the bits of a fixed-length code which is to be encoded;

c. a data register for storing bits which are read from memory cells in the field storing the variable-length codes, said data register being selectively operable to shift the bits stored therein progressively through successive orders;

d. a length counter for storing length indicators read from the related memory cells; and e. encoding control means having a portion for causing code bits to be read from said variable-length code storing field and entered into said data register in response to the presence of a fixed-length code in said argument register and having another portion for causing a selected number of these variable-length code bits to be serially shifted through and read out of said data register as determined by the data stored in said length counter, thereby excluding insignificant bits from the code thus read out.

8. An associative memory apparatus for use as an encoder-decoder to effect conversions between codes having bit strings of fixed length and corresponding prefix-free codes of different form having bit strings of variable length, said apparatus comprising:

a. rows of memory cells respectively storing a plurality of words each of which contains a variable-length code, a corresponding fixed-length code, and a length indicator representing the number of significant bits in the respective variable-length code, at least some of the memory cells in each of said rows being three-state cells each capable of assuming a significant binary 1 or 0 state or a "don't care" state wherein the bit which it stores is not significant; portions of said rows also being arranged in first, second and third fields, said first field containing three-state memory cells and storing the available variable-length codes, with the bit at a given end of each such code being positioned nearest a given end of said field, the remaining cells of said first field being in their "don't care" states, said second field storing the respective fixed-length codes corresponding to said variable-length codes, and said third field storing the respective length indicators corresponding to said variable-length codes;

b. a first argument register effective when said apparatus is being utilized as a decoder to store successive bits of a series of variable-length codes which are to be decoded into fixed-length codes, each such variable-length code having a unique matching relationship with not more than one of the variable-length codes stored in said memory cells, said first argument register being intermittently operable to shift the bits stored therein progressively through successive orders;

c. means for entering successive bits of a series of variable-length codes into said first argument register when said apparatus is being utilized as a decoder, said entering means initially causing an end bit in the first code of said series to occupy a position in said first argument register corresponding to said end position in said first memory field;

d. a second argument register effective when said apparatus is being utilized as an encoder for storing the bits of a fixed-length code which is to be encoded into a variable-length code;

e. a first data register effective when said apparatus is being utilized as an encoder for storing bits which are read from memory cells in said first memory field, said first data register being intermittently operable to shift the bits stored therein progressively through successive orders;

f. a second data register effective when said apparatus is being utilized as a decoder for storing bits which are read from memory cells in said second memory field;

g. a length counter for storing any selected length indicator which is read from said third memory field;

h. first associate means effective when said apparatus is being utilized as a decoder for causing the contents of said first argument register to be associatively identified with the row in said first memory field which contains a matching word;

i. second associate means effective when said apparatus is being utilized as an encoder for causing the contents of said second argument register to be associatively identified with the row in said second memory field which contains a matching word;

j. readout means effective when a matching word is identified for causing the portions of said word stored in said first, second and third fields to be entered respectively into said first and second data registers and into said length counter;

k. first shift control means effective when said apparatus is used as a decoder for causing the contents of said first argument register to be shifted through the number of bit positions represented by the number initially stored in said length counter; and l. second shift control means effective when said apparatus is used as an encoder for causing the contents of said first data register to be shifted through the number of bit positions represented by the number initially stored in said length counter.

9. An associative memory apparatus for use as a decoder to effect conversions between prefix-free codes having bit strings of variable length and corresponding codes of different form having bit strings of fixed length, said apparatus comprising:

a. rows of memory cells respectively storing a plurality of words each of which contains a variable-length code, a corresponding fixed-length code, and a length indicator representing the number of significant bits in the respective variable-length code, at least some of the memory cells in each of said rows being three-state cells each capable of assuming a significant binary 1 or 0 state or a "don't care" state wherein the bit which it stores is not significant; portions of said rows also being arranged in first, second and third fields, said first field containing three-state memory cells and storing the available variable-length codes, with the bit at a given end of each such code being positioned nearest a given end of said field, the remaining cells of first field being in their "don't care" states, said second field storing the respective fixed-length codes corresponding to said variable-length codes, and said third field storing the respective length indicators corresponding to said variable-length codes;

b. an argument register for storing successive bits of a series of variable-length codes which are to be decoded into fixed-length codes, each such variable-length code having a unique matching relationship with not more than one of the variable-length codes stored in said memory cells, said argument register being intermittently operable to shift the bits stored therein progressively through successive orders;

c. means for entering successive bits of a series of variable-length codes into said argument register, said entering means initially causing the end bit in the first code of said series to occupy a position in said argument register corresponding to the said end position in said first memory field;

d. a data register for storing bits which are read from memory cells in said second memory field;

e. a length counter for storing any selected length indicator which is read from said third memory field;

f. associate means for causing the contents of said argument register to be associatively identified with the contents of the row in said first memory field which contains a matching word;

g. readout means effective when a matching word is identified for causing the portions of said word stored in said second and third fields to be entered respectively into said data register and said length counter; and h. shift control means for causing the contents of said first argument register to be shifted through the number initially stored in said length counter.

10. An associative memory apparatus for use as an encoder-decoder to effect conversions between codes having bit strings of fixed length and corresponding prefix-free codes of different form having bit strings of variable length, said apparatus comprising:

a. rows of memory cells respectively storing a plurality of words each of which contains a variable-length code, a corresponding fixed-length code, and a length indicator representing the number of significant bits in the respective variable-length code, at least some of the memory cells in each of said rows being three-state cells each capable of assuming a significant binary 1 or 0 state or a "don't care" state wherein the bit which it stores is not significant; portions of said rows also being arranged in first, second and third fields, said first field containing three-state memory cells and storing the available variable-length codes, with the bit at a given end of each such code being positioned nearest a given end of said field, the remaining cells of said first field being in their "don't care" states, said second field storing the respective fixed-length codes corresponding to said variable-length codes, and said third field storing the respective length indicators corresponding to said variable-length codes;

b. an argument register for storing a fixed-length code which is to be encoded into a variable-length code, such fixed-length code having a unique matching relationship with not more than one of the fixed-length codes stored in said memory cells;

c. a data register for storing bits which are read from memory cells in said first memory field, said data register being intermittently operable to shift the bits stored therein progressively through successive orders;

d. a length counter for storing any selected length indicator which is read from said third memory field;

e. associate means for causing the contents of said argument register to be associatively identified with the row in said second memory field which contains a matching word;

f. readout means effective when a matching word is found for causing the portions of said word stored in said first and third fields to be entered respectively into said data register and said length counter; and g. shift control means for causing the contents of said data register to be shifted through the number of bit positions represented by the number initially stored in said length counter.

* * * * *